(12) United States Patent
Schmitt et al.

(10) Patent No.: US 11,582,210 B2
(45) Date of Patent: Feb. 14, 2023

(54) METHOD OF ENABLING A SECURE COMMUNICATION TO A TARGET DEVICE OVER A NETWORK

(71) Applicant: ABB Schweiz AG, Baden (CH)

(72) Inventors: Johannes Schmitt, Ladenburg (DE); Soeren Finster, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 98 days.

(21) Appl. No.: 17/313,496

(22) Filed: May 6, 2021

(65) Prior Publication Data
US 2021/0352051 A1 Nov. 11, 2021

(30) Foreign Application Priority Data

May 7, 2020 (EP) .................................. 20173540

(51) Int. Cl.
| | |
|---|---|
| *H04L 29/06* | (2006.01) |
| *H04L 9/40* | (2022.01) |
| *H04L 9/30* | (2006.01) |
| *H04L 9/32* | (2006.01) |

(52) U.S. Cl.
CPC ............ *H04L 63/0442* (2013.01); *H04L 9/30* (2013.01); *H04L 9/3268* (2013.01); *H04L 63/0428* (2013.01); *H04L 63/166* (2013.01)

(58) Field of Classification Search
CPC .................................................. H04L 63/0442
See application file for complete search history.

(56) References Cited

U.S. PATENT DOCUMENTS

| | | | |
|---|---|---|---|
| 2014/0208390 A1* | 7/2014 | Brown | G06F 21/335 726/4 |
| 2015/0312216 A1* | 10/2015 | Mohan | G05B 19/41855 726/11 |
| 2019/0109872 A1* | 4/2019 | Dhakshinamoorthy | H04L 43/06 |

(Continued)

OTHER PUBLICATIONS

"Embedded OPC UA Stack: Discovery and Security Configuration," 11 pp., downloaded from the Internet at URL:https://web.archive.org/web/20200217173520/https://documentation.unified-automation.com/uasdkhp/1.0.0/html/_12_ua_discovery_connect.html on Sep. 7, 2020 (Feb. 17, 2020).

(Continued)

*Primary Examiner* — Bradley W Holder
(74) *Attorney, Agent, or Firm* — Leydig, Voit & Mayer, Ltd.

(57) ABSTRACT

A method for enabling a secure communication with a target device over a network includes: opening an unsecured OPC UA Endpoint by an OPC UA Server that runs on the target device; connecting to the OPC UA Server over the network by an OPC UA Client running on a first device, and requesting the initial device certificate; receiving the initial device certificate by unsecured communication over the network; validating, by the first device, the initial device certificate; establishing, by the first device, a device certificate; encrypting, by the first device, at least the device certificate; sending the encrypted data over the network; decrypting, by the target device, the encrypted data using an initial device private key associated with the initial device certificate to obtain at least the device certificate; storing the device certificate on the target device; and opening a secured OPC UA Endpoint by the OPC UA Server.

15 Claims, 2 Drawing Sheets

(56) References Cited

U.S. PATENT DOCUMENTS

2019/0166004 A1    5/2019  Sherman et al.
2019/0297101 A1*   9/2019  Dhakshinamoorthy ............... G06F 21/6218

OTHER PUBLICATIONS

European Patent Office, Search Report in European Patent Application No. 20173540.4, 8 pp. (dated Sep. 18, 2020).

* cited by examiner

METHOD OF ENABLING A SECURE COMMUNICATION TO A TARGET DEVICE OVER A NETWORK

CROSS-REFERENCE TO RELATED APPLICATIONS

This patent application claims the benefit of European Patent Application No. 20173540.4, filed May 7, 2020, which is fully incorporated herein by reference for all purposes.

FIELD

The present disclosure relates to the integration of devices into, or upgrade of devices within, a network with a focus on enabling secure communication to the devices, such as field devices. Specifically, embodiments described herein relate to a method for enabling a secure communication with a target device over a network, to a target device, to a system including the target device and a further network device, to the further network device for enabling a secure communication with a target device over the network, and to a corresponding computer program product.

TECHNICAL BACKGROUND

The currently ongoing fourth industrial revolution, including what is known as "industry 4.0", is pushing in an unprecedented way towards automation and data exchange in manufacturing processes, but also within offices and household to provide smart connectivity between devices such as field devices, and in particular so-called embedded devices. A party often has a network infrastructure on-site, be it in a factory, office or even household, and desires that the devices communicate with controllers with each other over a network in a secure way so as to avoid security breaches ranging from eavesdropping to gather relevant data to malicious tempering with the devices which may cause catastrophic failure within the factory, office or household. Asymmetric cryptography based on a public key infrastructure (PKI) is a way to secure such communication.

OPC UA is a technology for communication with such devices. Therein, "OPC UA" is the well-known abbreviation for the Unified Architecture (UA) of the OPC Foundation. The current OPC UA specification, consisting of 14 parts, shall form the basis for all OPC UA-related terms and functions, and is incorporated herein by reference in its entirety. OPC UA supports PKI-based mechanisms to secure communication between an OPC UA Server running on a device, such as a sensor or actuator, and an OPC UA Client being part of a controller which may typically have a user interface. For a secure communication based on a PKI, certificates of both the OPC UA Server and the OPC UA Client are exchanged and validated to build a trust-relationship or security context.

However, many OPC UA Servers particularly on embedded devices are still lacking integration with a certificate-based secure OPC UA communication. A non-secured communication is often used, or a basic username/password-based concept is employed to secure the OPC UA communication. These approaches do not protect sufficiently against eavesdroppers and malicious manipulation. There is a large need for upgrades to certificate-based, encrypted and integrity protected communication. The party having the network infrastructure on-site often seeks to install new devices coming with an integrated OPC UA Server or upgrade old devices so as to communicate with controllers with each other over a network in a secure way based on a PKI, and may prefer the party's own PKI.

To build up the trust relationship between the OPC UA Server of the device and an OPC UA Client, such as during commissioning of a new device or re-initialization to upgrade an existing device connected to the party's network infrastructure, the party may trust a pre-installed device certificate of the device in question, but then may have to manage a lot of third-party certificates within the party's own PKI. Using such pre-installed device certificates may also cause validation issues in OPC UA Clients.

The party may want to generate own device certificates that are well integrated in the party's own PKI, but then needs to install the device certificates on the devices, which may be of different types due to coming from different manufacturers/vendors, and thus may have different hardware and operating systems. Particularly when the devices are embedded devices they may lack the ability to create certificates due to hardware restrictions. Device specific commissioning tools may be used to access the file system of the device directly in order to copy the device certificate there. But this may require proprietary software for each specific device type, and may often not be possible through a remote access over the network. Direct access to the device, such as through USB, may be used to install a device certificate, but is cumbersome and potentially insecure. Other approaches use an initially unsecured communication to the OPC UA Server on the device to access security related aspects and install a device certificate, but rely on the assumption of a trusted network connection being present during this initial phase, which may often not be true and present security risks. Other network protocols in an attempt to securely access the device, but their security may often not be estimated correctly, leading to inadvertent security risks. But even if they are deemed secure (e.g., SSH), they can make additional efforts in networking and configuration necessary, such as adjustments to firewalls and routing, and may ultimately introduce security risks if the party forgets to revert these adjustments.

Therefore, there is a need for improving the establishment of a security context or trust-relationship between an OPC UA Server integrated in the device and an OPC UA Client running on a network device.

SUMMARY

According to an embodiment, a method for enabling a secure communication with a target device over a network is provided. The method includes: opening an unsecured OPC UA Endpoint by an OPC UA Server that runs on the target device, the unsecured OPC UA Endpoint providing security context data that is in conformity with an OPC UA information model, wherein the security context data indicates the presence of an initial device certificate stored on the target device; connecting to the OPC UA Server over the network by an OPC UA Client running on a first device, and requesting the initial device certificate; receiving, by the OPC UA Client, the initial device certificate from the OPC UA Server by unsecured communication over the network; validating, by the first device, the initial device certificate against a root certificate or intermediate certificate of the issuer of the initial device certificate; establishing, by the first device, a device certificate; encrypting, by the first device, at least the device certificate using an initial device public key of the initial device certificate to produce encrypted data; sending the encrypted data from the OPC UA Client to the OPC UA Server over the network; decrypting, by the target device, the encrypted data using an initial device private key associated with the initial device certificate to obtain at least the device certificate; storing the device certificate on the target device; and opening a secured OPC UA Endpoint by the OPC UA Server, the secured OPC UA Endpoint providing access to technical functions of the target device via secure communication over the network based on the device certificate.

According to another embodiment, a target device is provided. The target device includes a memory and a network connector for connecting the target device to a network. The target device is configured to: run an OPC UA Server that opens an unsecured OPC UA Endpoint, the unsecured OPC UA Endpoint providing security context data that is in conformity with an OPC UA information model, wherein the security context data indicates the presence of an initial device certificate stored in the memory; receive a request for the initial device certificate from an OPC UA Client over the network; retrieve the initial device certificate from the memory and send the initial device certificate by unsecured communication over the network to the OPC UA Client; receive encrypted data from the OPC UA Client over the network, the encrypted data including a device certificate that is encrypted by using an initial device public key of the initial device certificate; decrypt the encrypted data using an initial device private key associated with the initial device certificate to obtain the device certificate; store the device certificate in the memory of the target device; and open a secured OPC UA Endpoint by the OPC UA Server, the secured OPC UA Endpoint providing access to technical functions of the target device via secure communication over the network based on the device certificate.

Further advantages, features, aspects and details that can be combined with embodiments described herein are evident from the dependent claims, the description and the drawings.

BRIEF DESCRIPTION OF THE DRAWINGS

More details will be described in the following with reference to the figures, wherein.

DETAILED DESCRIPTION

According to an embodiment, a method for enabling a secure communication with a target device over a network is provided. The network can be a network of an industrial site or other automation site, an office network, or a private network including, e.g., home appliances. The network may include devices configured to perform an industrial work process, such as a production or inspection process, and/or devices configured to automate office tasks or household tasks. The network may be wired, wireless, or a mixture thereof, and may particularly be a digital wireless network or include a digital wireless network. The network may be a local network, such as a LAN. The network may be a real time network such as Real Time Ethernet (RTE). The network may be a virtual network. The network may be a VPN (virtual private network).

The network or a part thereof may belong to a first party, in particular a party owning the industrial site, office or household. The first party may have obtained the target device from a second party, specifically bought the target device from the second party, and the first party may therefore be a customer of the second party who can be the vendor of the target device. The network may be an untrusted and/or unsecured network. Specifically, the first party may not be able to trust that all communication over the network is secure. The method may be a method of enabling a secure communication with the target device over an untrusted and/or unsecured network.

The target device is called by this name herein due to being the target of a method for enabling secure communication to it over the network. Since the target device is able to connect to the network, the target device may be called an intelligent device or a smart device, without this term implying here that the target device can necessarily connect to the Internet. The target device may include a network connector for connecting the target device to the network. The network connector may be the only interface for external access to the technical functions provided by the target device. The target device may be a headless target device, i.e., a device without user interface. The target device may be particularly be an embedded target device. An embedded target device has restricted processing power and/or restricted memory space, and may have strict power requirements. An embedded target device may not be able to do certificate issuing on the device. The target device may be unconfigured with respect to the network, i.e., has no configuration data showing a membership, past or present, to the network or a relation to another device of the network. For short, such a target device is called an unconfigured target device. The target device may never have been a part of the network or may have been reset, such as to factory settings. The target device may be field device, such as a sensor or an actuator. The target device may be some other device used in automation, e.g., a controller, which may be installed in a cabinet, or the like. The target device may be or include a PLC (programmable logic controller) or a DCS (distributed control system). The target device may be virtual device on a virtual machine.

The target device provides technical functions. The term "technical functions" shall include the case that one technical function is provided. The technical functions may relate to tasks of the industrial work process, or to the office tasks or the household tasks. The technical functions may include the collection of data, such as measurement data if the target device is a sensor, the execution of a movement or the change of a physical quantity, e.g. if the target device is a field device.

The network includes a first device. The first device may be configured for establishing a security context between itself and other devices of the network, in particular devices going through a commissioning phase, but possibly also devices that are reconfigured or reinitialized. The first device may be a general purpose computer, such as a PC, or a special purpose computer for establishing the security context. The first device may belong to, or be under the control of, the first party. The first device may run a program for establishing the security context, hereinafter called commissioning tool. The first device may enable a secure communication with the target device by establishing a security context with the target device. The first device is said to bootstrap the target device if the first device establishes a security context with an unconfigured target device. The method may be a method of bootstrapping a target device over a network to enable a secure communication with the target device. After establishing the security context with the target device, i.e., after the bootstrapping phase is over and a runtime phase has begun, the first device may securely communicate with the target device and/or provide information to other devices with which the first device has an established security context, wherein said information allows the other devices to securely communicate with the target device.

The method may include joining the target device to the network. Joining the target device to the network may include physically connecting the target device to a network infrastructure of the network, particularly a network infrastructure of the first party, such as on an industrial site of the first party. Joining the target device to the network may include assigning a network identification to the target device. The assignment of the network identification may be done manually/statically, e.g., by planning and engineering an address and by setting the assigned address to the target device. Alternatively, the assignment may be made automatically after connecting the target device to the network infrastructure, e.g., by using dynamic DNS/IP assignment together with DHCP. The network identification may be unique, at least within the network. The network identification may be or include: an IP address and/or a hostname. Joining the target device to the network may include assigning a network configuration to the target device. The network configuration may include the network identification and any item or combination of the following: an identification of a DNS server, a port, a URL, a subnet mask, a reliable source for network time.

The target device runs an OPC UA Server. The OPC UA Server of the target device may be registered with a Local Discovery Server (LDS) and/or a Global Discovery Server (GDS). The first device runs an OPC UA Client. When a device is said to run or execute OPC UA entities of functions it is understood that appropriate software of the device may handle these tasks. For instance, the commissioning tool of the first device may include the OPC UA Client as a part of its software routines or may at least control the execution of the OPC UA Client on the first device. Similarly, the target device may have software, such as proprietary software of the manufacturer of the target device, and this software may include or at least control the execution of the OPC UA Server on the target device.

The method may include establishing network connectivity between the first device and the target device. Network connectivity may include an ability to communicate via TCP/IP. The method may include making the network identification of the target device known to the first device. Making the network identification of the target device known to the first device may include discovering, by the first device, the network identification of the target device. Discovering the network identification of the target device may include an OPC UA discovery mechanism, such as the OPC UA FindServers service, by connecting to the LDS or GDS or by using mDNS, which is an OPC UA multicast subnet discovery. Alternatively, the network identification of the target device may be known to the first device, e.g., having been input to the first device from a human machine interface (HMI) or otherwise loaded into the first device.

The method includes opening an unsecured OPC UA Endpoint by the OPC UA Server, i.e., by the OPC UA Server that runs on the target device. Opening an OPC UA Endpoint may be creating/adding said Endpoint or enabling said Endpoint. The unsecured OPC UA Endpoint may be the only enabled OPC UA Endpoint which the OPC UA Server provides, or may be the only OPC UA Endpoint that the OPC UA Server provides (to the exclusion of other Endpoints) at this stage, particularly during the entire bootstrapping phase. The unsecured OPC UA Endpoint may implement "None" as OPC UA Security Policy. The unsecured OPC UA Endpoint may implement "None" as the OPC UA Message Security Mode. The unsecured OPC UA Endpoint may be called a Bootstrapping OPC UA Endpoint if the target device is an unconfigured target device.

The unsecured OPC UA Endpoint provides security context data. The security context data may be accessed by OPC UA Clients of other devices, such as the first device. The security context data contains data for establishing a security context with the target device. The security context data indicates the presence of an initial device certificate stored on the target device. The initial device certificate includes an initial device public key. A corresponding initial device private key may be stored on the target device. The initial device certificate and/or the initial device private key may be stored in a memory of the target device, such as a secure storage of the target device, like a TPM secure storage, where TPM is the abbreviation for Trusted Platform Module. The initial device certificate may be certificate installed by the manufacturer or vendor of the target device, and may accordingly be a vendor device certificate or manufacturer device certificate. Likewise, the initial device private key may be a vendor private key or a manufacturer private key.

The security context data is in conformity with the OPC UA information model. The security context data can be accessed by OPC UA calls to services/methods once an OPC UA Client has connected to the unsecured OPC UA Server. For instance, an information item of the security context data that indicates the presence of the initial device certificate may be embedded as a string at an OPC UA Property Node. The OPC UA Property Node may be defined by a node of the type OPC UA FileType and may be accessed by the methods thereof.

The unsecured OPC UA Endpoint may provide no access to the technical functions of the target device. The OPC UA Server or the target device may not provide access to the technical functions of the target device while the unsecured OPC UA Endpoint exists or is enabled or while the security context has not yet been established between the target device and another network device such as the first device. The OPC UA Server or the target device may not provide access to the technical functions of the target device during the bootstrapping phase.

The method includes connecting, by the OPC UA Client, to the OPC UA Server over the network, i.e., by the OPC UA Client running on the first device to the OPC UA Server running on the target device. The OPC UA Client connecting to the OPC UA Server may include connecting, by the OPC UA Client, to the unsecured OPC UA Endpoint. The OPC UA Client connecting to the OPC UA Server may include the OPC UA Client requesting a list of OPC UA Endpoints provided by the OPC UA Server, such as by the OPC UA GetEndpoints service. The list returned by the OPC UA Server may be a list of length one, containing the unsecured OPC UA Endpoint. The OPC UA Client may connect to the unsecured OPC UA Endpoint using the connection information contained in the list. The connection information may include at least one of host name, IP address, port number, and security options, e.g., the OPC UA Security Policy "None" and OPC UA Message Security Mode "None".

The OPC UA Client may browse the security context data. Browsing the security context data may include calls to OPC UA methods, such as read methods of a node of type FileType, and evaluating the returned data. The OPC UA Client may identify the presence of the initial device certificate, e.g., by finding a corresponding information element in the security context data, or rather in the returned data that corresponds to at least parts of the security context data.

The method includes requesting, by the OPC UA Client, the initial device certificate. The OPC UA Server may, upon receiving the request for the initial device certificate, retrieve or cause the target device to retrieve the initial device certificate from memory. The initial device certificate may be retrieved by OPC UA Server, or by the target device, from the secure storage. Therein, the initial device certificate may be provided by the secure storage, e.g., TPM secure storage, in read-only mode. The initial device certificate may then be sent by the OPC UA Server to the OPC UA Client in a response to the request, the sending of the initial device certificate being by unsecured communication. Requesting the initial device certificate may include the OPC UA Client reading an attribute of an OPC UA Property Node, if the initial device certificate is presented by to the OPC UA Client as such an attribute. Alternatively, requesting the initial device certificate may include the OPC UA Client using an OPC UA method call to a method at the OPC UA Server and obtaining the initial device certificate as a value passed back by this method.

The method includes receiving, by the OPC UA Client, the initial device certificate from the OPC UA Server. The initial device certificate is received by unsecured communication over the network. The initial device certificate may be received in a response to a request for the initial device certificate.

The method includes validating, by the first device, the initial device certificate. The validation is against a root certificate or intermediate certificate of the issuer of the initial device certificate. The root certificate or intermediate certificate of the issuer of the initial device certificate may be present in the first device or may be downloaded from an external trusted source. The external trusted source is independent of the target device. Validating the initial device certificate may include accessing, by the first device, a first trusted public-key infrastructure (PKI) holding the root certificate or the intermediate certificate of the issuer of the initial device certificate, the first trusted public-key infrastructure being independent of the target device. The first trusted PKI may be an external trusted PKI, located on a device not belonging to, or controlled by, the first party. The first trusted PKI holding the root certificate of the intermediate certificate of the issuer of the initial device certificate may be a non-local trusted PKI, located on a device outside of the network. The access may be at least partly over an external network, such as over the Internet, the external network being different from the network, which includes the first device and the target device. The root certificate or intermediate certificate of the issuer of the initial device certificate may be downloaded to the first device, and stored in the first device, e.g., in a root store. The issuer of the initial device certificate may be the second party, for instance the manufacturer or vendor of the target device. The first trusted PKI holding the root certificate of the intermediate certificate of the issuer of the initial device certificate may be a PKI of the vendor or of the manufacturer, i.e. a vendor PKI or manufacturer PKI.

The method may include authenticating the target device. Authenticating the target device may include a cryptographic protocol to prove to the first device that the target device possesses the initial device private key. For instance, the OPC UA Client may receive a signature from the OPC UA Server, signed with initial device private key, as a response to an OPC UA method call.

The method includes establishing, by the first device, a device certificate. The device certificate may be based on a second public-key infrastructure (PKI) trusted by the first device and being different from the first PKI holding the root certificate or the intermediate certificate of the issuer of the initial device certificate. The second PKI may be a PKI of the first party. The second PKI may be a local PKI. The local PKI may be located on the first device, or on a network device of the network other than the first device and other than the target device. The second PKI may be an internal PKI, located on a device belonging to, or under the control of, the first party, and this device may be local device of the network or a non-local device outside of the network. Establishing the device certificate may include, based on the second PKI, creating a device public key and a device private key for the target device, and creating the device certificate for the target device. The device certificate for the target device includes the device public key in this respect. Alternatively, establishing the device certificate may include integrating the initial device certificate into the second PKI. Integrating the initial device certificate into the second PKI may include signing the initial device certificate to transform the initial device certificate into the device certificate. The initial device certificate may signed by a root public key of a root certificate of the second PKI, or by an intermediate public key of an intermediate certificate of the second PKI to transform the initial device certificate into the device certificate that is based on the second PKI. If the first party owning or controlling the first device is a customer of the second party having manufactured or sold the target device, the device certificate can be called a customer device certificate, and the device public key and the device private key may then be called customer device public key and customer device private key. The second PKI may accordingly be called a customer PKI in this case, the root certificate or intermediate certificates of the second PKI may be called customer root certificate/customer intermediate certificate, and the corresponding root public key/intermediate public key may be called customer root public key/customer intermediate public key.

The device certificate may include data relating to a network identification of the target device within the network. The data relating to the network identification may be the network identification of the target device itself. The data relating to the network identification of the target device may include, or allow determination of, an IP address of the target device and/or an identification of a DNS server and/or a hostname of the target device. The data relating to the network identification may include, or allow the determination of, a unique identification of the target device within the network. The data relating to the network identification of the target device may be signed by the signature of the device certificate.

The method includes encrypting, by the first device, at least the device certificate using the initial device public key of the initial device certificate to produce encrypted data. Encryption to produce encrypted data may include encrypting the device private key using the initial device public key of the initial device certificate. The encrypted data may consist of or include, encrypted by the initial device public key, the device private key for the target device and the device certificate containing the device public key for the target device, particularly if the device public key and the device private key for the target device, and the device certificate for the target device have been created based on the second PKI. The encrypted data may consist of or include, encrypted by the initial device public key, the device certificate signed by a root or intermediate public key of the second PKI, which contains the initial device public key. In this case, the encrypted data may not include a private key.

The method includes sending the encrypted data from the OPC UA Client to the OPC UA Server over the network. The encrypted data may be sent by passing the encrypted data as a parameter of an OPC UA method call.

The method includes decrypting, by the target device, the encrypted data using the initial device private key associated with the initial device certificate to obtain at least the device certificate. In addition, the device private key for the target device may be obtained, if it was contained in the encrypted data. The decryption may be done by the OPC UA Server, or by some encryption/decryption program running on the target device with which the OPC UA Server can communicate. The OPC UA Server or the encryption/decryption program may be able to access the secure storage of the target device to obtain the initial device private key for the decryption. The method may include verifying, by the target device such as by the OPC UA Server or the encryption/decryption program, a content of the device certificate, e.g., a validity period of the device certificate.

The method includes storing the device certificate on the target device. The device certificate may be stored in the secure storage of the target device. The method may include storing the device private key on the target device, such as in the secure storage of the target device, particularly if the device private key was obtained by the target device when decrypting the encrypted data. The method may include uploading, by the OPC UA Server, the device certificate to a certificate store of an LDS or a GDS. The method may include establishing a trustlist by the OPC UA Server. The trustlist may include a trusted certificate or trusted certificates. The trusted certificate(s) may be associated with network devices contained within the network, wherein the network devices may particularly be the first device itself and devices within the network with which the first device has established a trust relationship. The trusted certificate or trusted certificates may be, or be derivable from, a root or intermediate certificate of the second PKI (e.g., customer PKI). The trusted certificate or the trusted certificates may be transmitted from the OPC UA Client to the OPC UA Server in an encrypted form, e.g., within the encrypted data and/or within second encrypted data. The second encrypted data may be sent in the same message as the encrypted data or in a different message. The second encrypted data may be produced on the first device in any of the following ways: encryption using the initial device public key of the initial device certificate, or encryption using the device public key of the device certificate, or encryption using an ephemeral key agreed upon by the OPC UA Client and the OPC UA Server through performance of a key agreement protocol.

The method may include closing the unsecured OPC UA Endpoint. Closing the unsecured OPC UA Endpoint may include disabling the unsecured OPC UA Endpoint, removing the OPC UA Endpoint, or first disabling the OPC UA Endpoint and removing it later after opening another Endpoint.

The method includes opening a secured OPC UA Endpoint by the OPC UA Server. Opening the secured OPC UA Endpoint may include creating/adding the secured OPC UA Endpoint or enabling the secured OPC UA Endpoint. The secured OPC UA Endpoint may be the only enabled OPC UA Endpoint which the OPC UA Server provides or may be the only OPC UA Endpoint that the OPC UA Server provides (to the exclusion of other Endpoints) at this stage, which can be called the runtime phase. The secured OPC UA Endpoint provides access to technical functions of the target device via secure communication over the network based on the device certificate. The device certificate may be used to sign and/or encrypt communication between the secured OPC UA Endpoint and OPC UA Clients, such as the OPC UA Client of the first device or an OPC UA Client of another network device of the network. The secured OPC UA Endpoint may implement, e.g., "Aes128-Sha256-RsaOaep" or "Basic256Sha256" as OPC UA Security Policy. The secure OPC UA Endpoint may implement OPC UA Message Security Modes "Sign" or "Sign&Encrypt". The secured OPC UA Endpoint can be called a Runtime OPC UA Endpoint. The secured OPC UA Endpoint may present data relating to the technical functions of the target device in accordance with the OPC UA information model. The data relating to the technical functions within the secured OPC UA Endpoint of the OPC UA Server of the target device may provide access to the technical functions of the target device for OPC UA Clients of network devices having established a security context based on, or derived from, the trust relationship (security context) built up between the first device and the target device.

The unsecured OPC UA Endpoint may be closed before opening the secured OPC UA Endpoint. Alternatively, the unsecured OPC UA Endpoint and the secured OPC UA Endpoint may coexist after the security context between the first device and the target device has been established, i.e., in the runtime phase. The secured OPC UA Endpoint may contain decommissioning data in accordance with the OPC UA information model, the decommissioning data allowing to OPC UA Clients of network devices connected with the secure OPC UA Endpoint to cause the OPC UA Server to reopen (create/add or enable) the unsecured OPC UA Endpoint. The unsecured OPC UA Endpoint may contain decommissioning data in accordance with the OPC UA information model, allowing OPC UA Clients connected to the unsecured UA Endpoint to successively perform any or all of the following: disestablish the security context, close the secured OPC UA Endpoint, unload the device certificate from the (secure) storage, unload the device private key from the (secure) storage, reset the target device to factory settings. The target device may then be reinitialized using the method described herein, or may be disconnected from the network.

The method of enabling a secure communication with the target device over the network may include establishing a secure communication with the target device over the network. The method may then be called a method of enabling and establishing a secure communication with the target device over the network. The secure communication may be established between a network device and the target device. The network device may be the first device or a second device within the network. More specifically, the secure communication may be established between an OPC UA Client of the network device and the secured OPC UA Endpoint of the OPC UA Server of the target device. The OPC UA Client of the network device may be (i) an OPC UA Client run on a network device different from the first device, (ii) an OPC UA Client run on the first device, and being different from the OPC UA Client used for enabling the secure communication, or (iii) the OPC UA Client run on the first device used for enabling the secure communication. In the first two cases (i) and (ii), the OPC UA Client of the network device may be a part of, or controlled by, software such as a controller, and typically being different from the commissioning tool.

Establishing the secure communication may include any of the following. The OPC UA Client of the network device may discover the OPC UA Server, e.g., by the OPC UA service "FindServers". The OPC UA Client of the network device may connect to the OPC UA Server. The OPC UA Client of the network device may obtain a list of OPC UA Endpoints from the OPC UA Server, e.g., by the OPC UA service "GetEndpoints", wherein the list may contain only the secured OPC UA Endpoint, or may contain the secured OPC UA Endpoint and the unsecured OPC UA Endpoint. The OPC UA Client of the network device may connect to the secured OPC UA Endpoint. Connecting to the secured OPC UA Endpoint may include any of the following. The OPC UA Client of the network device may send a secure session request to the secured OPC UA Endpoint, the secure session request including a device certificate of the network device. The secured OPC UA Endpoint, respectively the OPC UA Server, may validate the device certificate of the network device, such as against a root certificate or intermediate certificate of the second PKI (e.g., customer PKI) contained in the trustlist of the OPC UA Server. The secured OPC UA Endpoint may send a secure session response to the OPC UA Client of the network device, the secure session response including the device certificate (i.e., the device certificate previously stored in the target device in the method for enabling secure communication). The OPC UA Client of the network device, respectively the controller or network device, may validate the device certificate against a root certificate or intermediate certificate of the second PKI (e.g., customer PKI). Validation of the device certificate may include remotely accessing the second PKI and downloading the root certificate or the intermediate certificate of the second PKI. The OPC UA Client of the network device may establish a secure transmission to the secured OPC UA Endpoint using the device certificate, e.g., to send requests. The secured OPC UA Endpoint may establish a secure transmission to the OPC UA Client of the network device using the device certificate of the network device, e.g., to send responses to the requests. The method may include establishing a secure communication between the OPC UA Client of a network device and the secured OPC UA Endpoint of the OPC UA Server based at least on the device certificate, such as based on the device certificate and the device certificate of the network device.

The method may include accessing, by the OPC UA Client of the network device through the secure communication with the secured OPC UA Endpoint, at least one technical function of the technical functions of the target device over the network. Accessing the at least one technical function may include downloading technical data of the target device, such as measurement data produced by the target device, particularly if the target device is a sensor, or such as status data about the status of the target device, including data for fault analysis. Downloading may include requesting the technical data from the OPC UA Server, and receiving the technical data from the OPC UA Server in a response to the request. Accessing the at least one technical function may include sending commands to the target device, the commands causing the target device to perform a technical function, such as performing measurements (effectively polling measurement data if the measurement data is then downloaded), particularly if the target device is a sensor, or such as performing a movement or influencing a physical quantity, particularly if the target device is an actuator.

The method may include updating the device certificate or other certificates, or establishing further certificates via the secure communication between the OPC UA Client of the network device and the secured OPC UA Endpoint of the OPC UA Server of the target device.

The method described herein offers several advantages. The method allows the whole process of enabling a secure communication with the target device (establishing a security context/a trust-relationship with the target device) to be executed remotely over the network, e.g., by the commissioning tool on the first device. Such remote execution is less cumbersome than directly accessing the each of potentially many target devices. Additionally, it can mitigate risks coming with direct access to the target devices, e.g., manipulated USB flash drives. Unlike some known methods it does not assume that the network communication is trustworthy or secure. The network may be unsecured (no security measures taken) or untrusted (security measures taken but not deemed sufficient), and still the method described herein offers secure certificate handling.

The functionality offered by the OPC UA Server of the target device is split between two OPC UA Endpoints, an unsecured OPC UA Endpoint offering only functionality to establish the security context. Closing the unsecured OPC UA Endpoint in the runtime phase may enhance security. While the communication with the unsecured OPC UA Endpoint may be over an unsecure or at least untrusted network, and while this communication itself may not be secured by PKI-based mechanisms, validation of the initial device-certificate against the root/intermediate certificate of the issuer of the initial device certificate (e.g., vendor of the target device) prevents modification on the way from OPC UA Server to the OPC UA Client. By using the initial device-certificate to encrypt the device certificate, the latter can be secured against modification on the way back to the OPC UA Server. Once a security context is established, access to the technical functions of the target device becomes available. That means, the OPC UA Server offers access to the technical functions of the target device (via the secured OPC UA Endpoint) only after the security context is established via the unsecured OPC UA Endpoint. To implement this method, two OPC UA Endpoints are started. It the device already provides OPC UA based connectivity, the additional overhead required to start additional OPC UA Endpoints is typically low and manageable even for embedded target devices.

All communication between the first device and the target device, and actions performed within the target device to establish the security context, particularly the communication over the network, can be integrated into the OPC UA framework. The method described herein can be applied in line with the OPC UA specification, i.e. it is not necessary to work outside the OPC UA specification (or to modify the OPC UA specification to cover the method described herein). When the device certificate signs the network identification (such as IP/DNS address) or data relating to it, the device certificate fully complies with the OPC UA standard so as not to cause validation issues in OCP UA Clients following the OPC UA specification. A pre-installed initial device certificate, such as a vendor/manufacturer certificate installed on the target device, cannot offer this because the network identification is not known at the time of installing the initial device certificate. The method is independent of the device type, and underlying proprietary hardware or software of the device, and can be universally applied to each target device running an OPC UA Server. The method does not need adjustments to firewalls or routing, and so one cannot forget to revert such adjustments. No other technology or protocol than OPC UA-based communication needs to be used for enabling the secure communication with the target device. Therefore, as the mechanisms of the method can be integrated with OPC UA Clients and Servers following the OPC UA specification, there are no potential media-breaches, e.g., due to using different protocols, or need for proprietary software to install certificates on target devices or need to access the target device directly. The certificate-handling can be done remotely when the target device is already installed (e.g., at the industrial site of the first party) and connected to and untrusted network. The overall result is a better integrated, simplified and secured workflow fully within the OPC UA framework, particularly as part of the target device setup and commissioning process.

Additionally, the first party (e.g., customer having bought the target device from a device vendor) can make use of his own PKI. There is no need to manually trust third party certificates, e.g., vendor/manufacturer certificates or an initial (vendor/manufacturer) device certificate pre-installed on the target device. The method makes use of some common PKI mechanisms, like certificate validation and authentication, and the additional overhead of the method described herein is typically low, particularly when the target device already supports PKI-based mechanisms. The method is applicable both for target devices installed for the first time, as well as to upgrade security for target devices within an existing network infrastructure. The method does not require large changes to an existing network infrastructure.

The method described herein may provide security by design and security in depth for establishing a secure communication with an OPC UA Server on an embedded target device (e.g., security bootstrapping process for the target device), while the embedded target device does not have the ability to create certificates due to hardware restrictions. But the method may also be used for normal UA Servers/target devices to integrate them with the PKI of the first party in a remote and highly automatic way.

According to a further embodiment, a target device is provided. The target device may be an embedded target device. The target device may be field device, such as a sensor or actuator. The target device may be a device for an industrial process or other automation process. The target device includes a memory. The memory may include a secure storage, such as a TPM secure storage. The memory may include a RAM and may include a ROM. The target device may include further components such as at least one of: a processor such as a central processing unit (CPU), an input unit such as a user interface (UI), an output unit such as a display, LED status lights or sound device, a control unit, and an internal or external power supply. The target device may include software, including an operating system. The target device includes a network connector for connecting the target device to a network. The target device may allow remote access over the network when the network connector connects the target device to network infrastructure. The target device may be called a smart device, without necessarily implying that it has connection to the Internet. The target device may include further interfaces for data exchange, such as USB ports, but the network connector may alternatively be the only interface for data exchange with the target device. The target device may be headless, i.e., lacking an input unit. The target device may not have an output unit. The target device may have some or all of the properties described herein with respect to the method of enabling secure communication with the target device over a network.

The target device may have an integrated OPC UA Server, provided by factory settings, or may be retrofitted with an OPC UA Server. The target device is configured to run the OPC UA Server that opens an unsecured OPC UA Endpoint. The unsecured OPC UA Endpoint provides security context data that is in conformity with an OPC UA information model. The security context data may be remotely accessed by an OPC UA Client using OPC UA message exchanges. The security context data indicates the presence of an initial device certificate stored in the memory, such as in a secure storage of the memory. The target device, respectively the OPC UA Server, is configured to receive a request for the initial device certificate from an OPC UA Client over the network, to retrieve the initial device certificate from the memory and send the initial device certificate by unsecured communication over the network to the OPC UA Client. The target device, respectively the OPC UA Server, is configured to receive encrypted data from the OPC UA Client over the network, the encrypted data including a device certificate that is encrypted by using an initial device public key of the initial device certificate. Request, retrieval, and sending may be done via OPC UA message exchanges. The target device is configure to decrypt the encrypted data using an initial device private key associated with the initial device certificate to obtain the device certificate. Decryption may be executed by the OPC UA Server, or initiated by the OPC UA Server and executed by other software of the target device. Decryption may include retrieving the initial device private key from the memory, particularly from the secure storage. The target device is configure to store the device certificate in the memory of the target device. The target device, respectively the OPC UA Server, is configured to open a secured OPC UA Endpoint, the secured OPC UA Endpoint providing access to technical functions of the target device via secure communication over the network based on the device certificate.

The target device, respectively its components, including software such as the OPC UA Server, may be configured to realize or perform any of the features described herein with respect to the method of enabling secure communication with the target device over a network. When the target device is said to run software such as the OPC UA Server, to exchange some data over the network (send or receive), to encrypt or decrypt some data, or to retrieve some data internally, it is understood that this may involve typical hardware, such as the processor processing that data, possibly under the control of the control unit, and the memory to read data from or write data to, and the network connector acting as a network interface for the exchange of data over the network, and may involve software to set up, configure and execute the OPC UA Server and to run a protocol stack for data exchange over the network, and the like.

According to another embodiment, a computer program product is provided. The computer program product contains a computer program. When the computer program is installed in the target device, e.g. in the memory of the target device, and is executed by the target device, e.g., by the processor of the target device, and the target device is connected to a network, the computer program causes the target device to: run an OPC UA Server that opens an unsecured OPC UA Endpoint, the unsecured OPC UA Endpoint providing security context data that is in conformity with an OPC UA information model, wherein the security context data indicates the presence of an initial device certificate stored in the memory; receive a request for the initial device certificate from an OPC UA Client over the network; retrieve the initial device certificate from the memory and send the initial device certificate by unsecured communication over the network to the OPC UA Client; receive encrypted data from the OPC UA Client over the network, the encrypted data including a device certificate that is encrypted by using an initial device public key of the initial device certificate; decrypt the encrypted data using an initial device private key associated with the initial device certificate to obtain the device certificate; store the device certificate in the memory of the target device; and open a secured OPC UA Endpoint by the OPC UA Server, the secured OPC UA Endpoint providing access to technical functions of the target device via secure communication over the network based on the device certificate. The target device may have any of the features described herein, and the computer program may cause the target device to execute any of the method features described herein in connection with the target device.

According to a further embodiment, a network device is provided. The network device may be a controller, particularly a controller for controlling field devices. The network device includes a memory and a network connector for connecting the network device to a network. The network device may execute a commissioning tool being a computer program. The network device, respectively its commissioning tool, is configured to run an OPC UA Client for accessing an unsecured OPC UA Endpoint of a target device, the unsecured OPC UA Endpoint providing security context data that is in conformity with an OPC UA information model, wherein the security context data indicates the presence of an initial device certificate stored in the memory, and for browsing the security context data. Browsing the security context data may include identifying, within the security context data, an information element indicating the presence of the initial device certificate. Browsing may be involve an exchange of OPC UA messages, such as queries and responses. The OPC UA Client is configured to send a request for transmission of the initial device certificate from an OPC UA Client over the network, and to receive the initial device certificate from the unsecured OPC UA Endpoint by unsecured communication over the network. The network device, respectively its commissioning tool, is configured to validate the initial device certificate against a root certificate or intermediate certificate of the issuer of the initial device certificate. Validating the initial device certificate may include accessing a trusted public-key infrastructure holding the root certificate or the intermediate certificate of the issuer of the initial device certificate, the trusted public-key infrastructure being independent of the target device. The trusted public-key infrastructure may be accessed over the Internet. The network device, respectively its commissioning tool, is configured to encrypt at least the device certificate using an initial device public key of the initial device certificate to produce encrypted data. A device private key associated with a device public key of the device certificate may be encrypted together with the device certificate and form part of the produced encrypted data, or may be encrypted separately to form second encrypted data. The OPC UA Client is configured to send the encrypted data (and second encrypted data, if any) from the OPC UA Client to the OPC UA Server over the network so that the target device can decrypt the encrypted data (and second encrypted data, if any) using an initial device private key associated with the initial device certificate to obtain the device certificate (and the device private key, if any), store the device certificate in the memory of the target device (and the device private key, if any), and have a secured OPC UA Endpoint opened by the OPC UA Server, the secured OPC UA Endpoint providing access to technical functions of the target device via secure communication over the network based on the device certificate. The network device may be the first device as described herein, and may include any of the structural and functional features thereof.

According to another embodiment, a system is provided, the system including a first device and a target device as described herein, the first device and the target device being connected over a network and configured to carry out the method described herein. A yet further embodiment relates to the use of the system described herein to carry out the method described herein.

Figure 1:
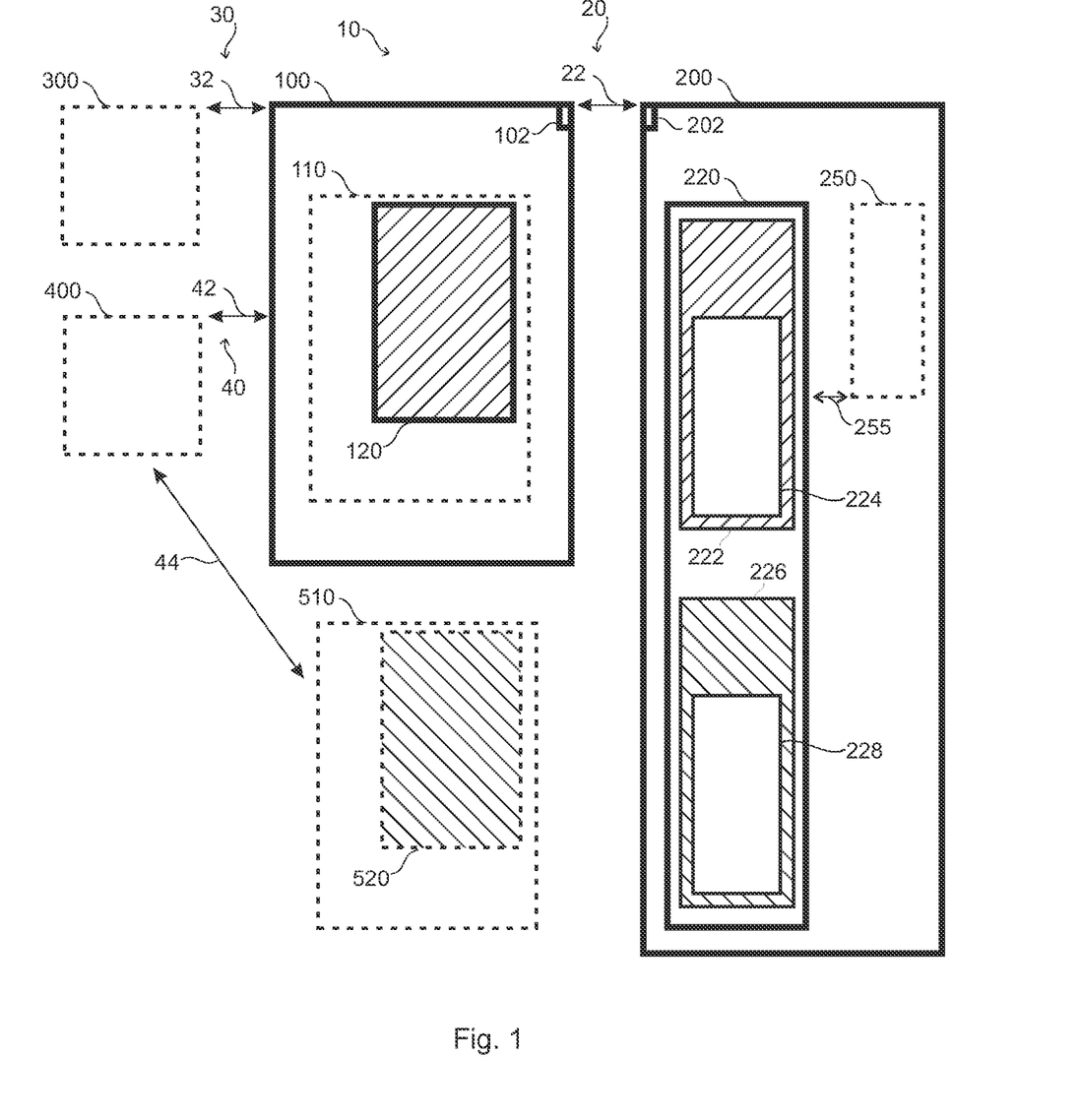
FIG. 1 shows a target device, a first device, and a system including the target device and the first device according to embodiments described herein.

FIG. 1 shows a system 10, and is used to illustrate an exemplary method of enabling and establishing a secure communication to a target device 200 over a network 20. The system 10 includes a first device 100, the target device 200, an external PKI 300 of the vendor of the target device (vendor PKI), and an internal PKI 400 of the purchaser of the target device (customer PKI). The first device 100 includes a network connector 102 connected via network infrastructure 22 of the network 20 to a network connector 202 of the target device 200. The first device executes a commissioning tool 110, a computer program that runs an OPC UA Client 120. The second device 200 includes a secure storage 250 accessible via internal communication path 255 from an OPC UA Server 220 that is running on the target device 200.

The target device 200 has been assigned a network identification when joined to the network 20, e.g., a DNS/IP address obtained via DHCP. The commissioning tool 110 knows the network identification of the target device 200, e.g., having discovered it using LDS, GDS or mDNS services of OPC UA. The target device 200 is unconfigured and provides no security for OPC UA message exchange, and is thus said to be in a bootstrapping phase. The OPC UA Server 220 provides an unsecured OPC UA Endpoint, here called Bootstrapping OPC UA Endpoint 222. The Bootstrapping OPC UA Endpoint 222 provides data 224 indicating the presence of an initial device certificate, here called vendor device certificate for having been pre-installed by the vendor of the target device 200. The data 224 is part of the OPC UA information model, e.g. embedded as string at a property node or using the OPC UA FileType. The vendor device certificate is stored in the secure storage 250, together with a matching initial device private key, here called vendor device private key.

The OPC UA Client 120 discovers the OPC UA Server 220 (e.g., via "FindServers"), connects to the OPC UA Server 220, requests a list of OPC UA Endpoints of the OPC UA Server 220 (e.g., via "GetEndpoints"), obtains the list with the Bootstrapping OPC UA Endpoint 222 as the sole entry, and connects to the Bootstrapping OPC UA Endpoint 222. The OPC UA Client 120 exchanges OPC UA messages using OPC UA Message Security Mode "None" to browse the data 224 and to identify the presence of the vendor device certificate.

The OPC UA Client 120 downloads the vendor device certificate, including the OPC UA Client 120 requesting the vendor device certificate from the OPC UA Server 220, and the OPC UA Server 220 retrieving the vendor device certificate by internal communication via the communication path 255 with the secure storage 250 and sending the vendor device certificate to the OPC UA Client 120 as a response to the request. The commissioning tool 110 validates the vendor device certificate against a root or intermediate certificate of the vendor, which may be installed in the commissioning tool 110 or downloaded from the vendor PKI 300 over the Internet 30 via internet connection 32. The OPC UA message exchange is still using OPC UA Message Security Mode "None", but the validation of the vendor device certificate ensures that the message exchange has not been tempered with.

In a first alternative, the commissioning tool 110 creates a customer device certificate integrated with the customer PKI 400, signed with a customer root certificate or customer intermediate certificate. To this end, the commissioning tool 110 can access the customer PKI 400 over a network connection 42 of an internal network 40, wherein the internal network may be a part of the network 20 or may be independent thereof. The customer device certificate includes and signs a customer device public key and the network identification of the target device 200, e.g., DNS or IP address. The customer device certificate and a customer device private key matching the customer device public key are encrypted using the vendor public key of the vendor device certificate to produce encrypted data. In a second alternative, the commissioning tool adds the network identification of the target device 200 to the vendor device certificate and signs the vendor device certificate with a customer root certificate or customer intermediate certificate to integrate the resulting customer device certificate into the customer PKI 400. The customer device certificate is encrypted using the vendor public key of the vendor device certificate to produce encrypted data. In this second alternative, no customer device private key needs to be sent since the vendor device private key still matches the public key of the customer device certificate because it is stemming from the vendor device certificate.

The encrypted data is transferred back from the OPC UA Client 120 to the OPC UA Server 220, e.g. using an OPC UA method call with the encrypted data as parameter. The OPC UA Server 220 decrypts the encrypted data, or has the encrypted data decrypted on the target device 200, using the vendor device private key associated with the vendor device certificate. The OPC UA Server 220 may again access the secure storage 250 via internal communication path 255 to obtain the vendor device private key to be used in the decryption process. The OPC UA Server 220 thus obtains the customer device certificate, and, if applicable, the customer device private key. The OPC UA Server 220 may verify the content of the customer device certificate, such as expiration date etc. The OPC UA message exchange is still unsecured (OPC UA Message Security Type: "None"), but the encryption with the vendor device certificate secures against modification of the encrypted data, including at least the customer device certificate.

With the customer device certificate successfully decrypted and verified, the customer device certificate is stored in the secure storage, and also the customer private key, if applicable. The customer device certificate is a certificate for future use in a secure OPC UA Endpoint, called Runtime OPC UA Endpoint 226 here, during a Runtime Phase in which technical functions of the target device 200 can be remotely accessed by OPC UA Clients through the Runtime OPC UA Endpoint.

The Runtime phase starts with the OPC UA Server 220 opening the Runtime OPC UA Endpoint 226, which uses the customer device certificate to secure OPC UA message exchange. The Runtime OPC UA Endpoint provides the data 228 according to an OPC UA information model that was intended to be hosted by the OPC UA Server to allow access to the technical functions of the target device 200. Using the customer device certificate the Runtime OPC UA Endpoint 226 can make use of the established trust-relationship, providing OPC UA Client and OPC UA Server identification and encrypted communication. For instance, a controller 510 runs an OPC UA Client 520, wherein the controller 510 is a runtime software executed either by the first device 100 or some other network device of the network 20 and having a network connection 44 of network 40 to the customer PKI 400. The OPC UA Client 520 connects to the Runtime OPC UA Endpoint 226, wherein the OPC UA Client 520 may have used the OPC UA services FindServers and GetEndpoints. The Runtime OPC UA Endpoint 226 securely communicates with the OPC UA Client 520 using the customer device certificate to sign, or sign and encrypt, OPC UA messages, after the OPC UA Client 520 has validated the customer device certificate against the customer root certificate or the customer intermediate certificate by accessing the customer PKI 400 via network connection 44. The OPC UA Client 520 can access the technical functions of the target device via the secure communication with the Runtime OPC UA Endpoint 226, e.g. to retrieve measurement data of a sensor or to command actions of an actuator if the target device is a field device.

Figure 2:
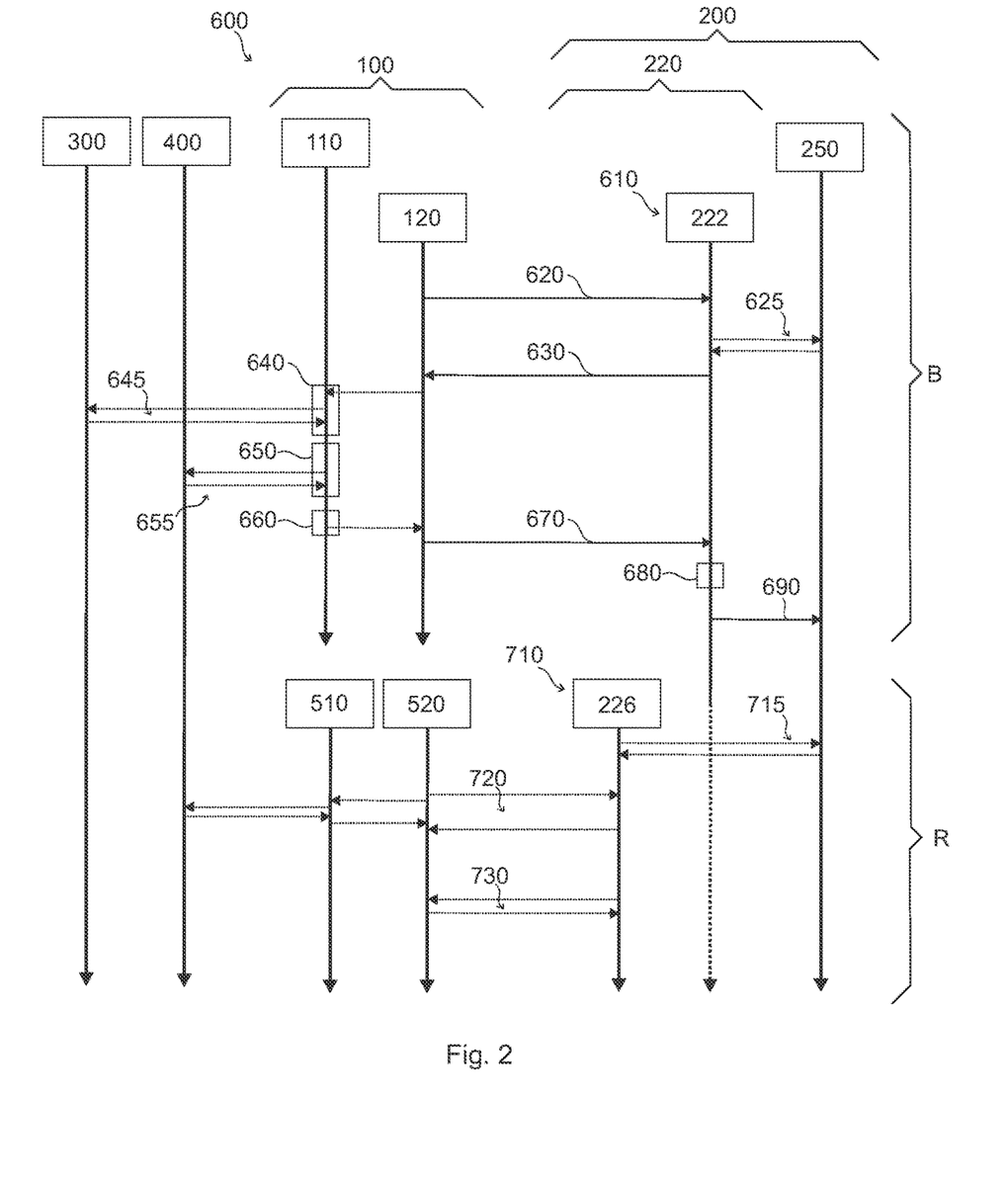
FIG. 2 illustrates a method for enabling secure communication with a target device over a network according to an embodiment described herein.

FIG. 2 illustrates an exemplary method 600 of enabling and establishing a secure communication to a target device 200 over a network. The reference signs of FIG. 1 are used. The method 600 includes the following. The OPC UA Server 220 of the target device 200 opens an unsecured OPC UA Endpoint 222 (feature 610), the unsecured OPC UA Endpoint 222 providing security context data 224 indicating the presence of an initial device certificate stored in the secure storage 250 of the target device. The OPC UA Client 120 running on the first device 100 connects to the OPC UA Server 220, respectively to the unsecured OPC UA Endpoint 222, over the network 20, and requesting the initial device certificate (feature 620). The secured OPC UA Endpoint 222 may retrieve the initial device certificate from the secure storage 250 (feature 623). The OPC UA Client receives the initial device certificate from the OPC UA Server, respectively from the unsecured OPC UA Endpoint of the OPC UA Serer, by unsecured communication over the network 20 (feature 630). The first device 100, respectively the commissioning tool 110, validates the initial device certificate against a root certificate or intermediate certificate of the issuer of the initial device certificate (feature 640). This may include the commissioning tool 110 accessing the external PKI 300 and downloading the root certificate of intermediate certificate of the issuer of the initial device certificate (feature 645). The first device, respectively the commissioning tool 110, establishes a device certificate (feature 640). This may include the commissioning tool 110 accessing the internal PKI 400 for integrating the device certificate therein (feature 645). The first device, respectively the commissioning tool, encrypts at least the device certificate using an initial device public key of the initial device certificate to produce encrypted data (feature 660). The OPC UA Client 120 sends the encrypted data to the OPC UA Server 220, respectively to the unsecured OPC UA Endpoint 222, over the network 20 (feature 670). The target device, respectively the unsecured OPC UA Server 222 or some other software executed by the target device, decrypts the encrypted data using an initial device private key associated with the initial device certificate to obtain at least the device certificate (feature 680). The unsecured OPC UA Endpoint 222, respectively the OPC UA Server 220 or the target device, stores the device certificate in the secure storage 250 on the target device (feature 690). Features 610 to 690, and any features intermediate in time described herein for the method, belong to the bootstrapping phase B of the target device 200. The OPC UA Server 220 opens a secured OPC UA Endpoint 226, the secured OPC UA Endpoint providing access to technical functions of the target device 200 via secure communication over the network 20 based on the device certificate (feature 710). This may include retrieving the device certificate from the secure storage 250 (feature 715). The OPC UA Client 510 of the network device running the controller 510 and the OPC UA Server 220, respectively the secured OPC UA Endpoint 226, may exchange and validate certificates to establish a security context (secure communication/session, feature 720). The OPC UA Client 510 of the network device may access technical functions of the target device 200 via the secured OPC UA Endpoint 226 making use of the secured communication. Features 710 to 730, and any features intermediate in time described herein for the method, belong to the runtime phase R of the target device 200.

While the foregoing is directed to embodiments, these embodiments, or features of theses embodiments, may be combined with other embodiments to yield yet further embodiments. The description is to be considered illustrative and not restrictive, and the scope shall be defined by the claims that follow.

The invention claimed is:

1. A method for enabling a secure communication with a target device over a network, the method comprising:
   opening an unsecured Open Platform Communications Unified Architecture (OPC UA) Endpoint by an OPC UA Server that runs on the target device, the unsecured OPC UA Endpoint providing security context data that is in conformity with an OPC UA information model, wherein the security context data indicates the presence of an initial device certificate stored on the target device;
   connecting to the OPC UA Server over the network by an OPC UA Client running on a first device, and requesting the initial device certificate;
   receiving, by the OPC UA Client, the initial device certificate from the OPC UA Server by unsecured communication over the network;
   validating, by the first device, the initial device certificate against a root certificate or intermediate certificate of the issuer of the initial device certificate;
   establishing, by the first device, a device certificate;
   encrypting, by the first device, at least the device certificate using an initial device public key of the initial device certificate to produce encrypted data;
   sending the encrypted data from the OPC UA Client to the OPC UA Server over the network;
   decrypting, by the target device, the encrypted data using an initial device private key associated with the initial device certificate to obtain at least the device certificate;
   storing the device certificate on the target device; and
   opening a secured OPC UA Endpoint by the OPC UA Server, the secured OPC UA Endpoint providing access to technical functions of the target device via secure communication over the network based on the device certificate.

2. The method of claim 1, wherein the device certificate includes data relating to a network identification of the target device within the network.

3. The method of claim 1, wherein, prior to requesting the initial device certificate, the OPC UA Client browses the security context data and identifies the presence of the initial device certificate.

4. The method of claim 1, wherein, upon receiving the request for the initial device certificate, the OPC UA Server retrieves the initial device certificate from a secure storage of the target device and sends the initial device certificate to the OPC UA Client.

5. The method of claim 1, wherein validating the initial device certificate includes accessing a trusted public-key infrastructure holding the root certificate or the intermediate certificate of the issuer of the initial device certificate, the trusted public-key infrastructure being independent of the target device.

6. The method of claim 1, comprising: establishing a secure communication based on the device certificate between an OPC UA Client of a network device and the secured OPC UA Endpoint of the OPC UA Server, and accessing a technical function of the target device by the network device over the network, wherein the network device is the first device or a second device within the network.

7. The method of claim 6, wherein the device certificate is based on a second public-key infrastructure trusted by the first device.

8. The method of claim 7, wherein establishing the device certificate includes (a) creating a device public key and a device private key and creating the device certificate based on the second public-key infrastructure, or (b) integrating the initial device certificate into the second public-key infrastructure by signing the initial device certificate to transform the initial device certificate into the device certificate.

9. The method of claim 7, wherein establishing the secure communication includes validating, by the network device, the device certificate against a root certificate or intermediate certificate of the second public-key infrastructure.

10. The method of claim 1, wherein the data relating to a network identification of the target device includes an IP address of the target device and/or an identification of a DNS server and/or a hostname of the target device.

11. The method of claim 1, comprising: joining the target device to the network and establishing network connectivity with the first device using TCP/IP.

12. The method of claim 1, comprising: closing the unsecured OPC UA Endpoint before opening the secured OPC UA Endpoint.

13. A target device, comprising:
   a memory and a network connector for connecting the target device to a network, the target device being configured to:
      open an unsecured Open Platform Communications Unified Architecture (OPC UA) Endpoint by an OPC UA Server that runs on the target device, the unsecured OPC UA Endpoint providing security context data that is in conformity with an OPC UA information model, wherein the security context data indicates the presence of an initial device certificate stored in the memory;
      receive a request for the initial device certificate from an OPC UA Client that is connected with the OPC UA Server over the network;
      retrieve the initial device certificate from the memory and send the initial device certificate by unsecured communication over the network from the UPC UA Server to the OPC UA Client for validation of the initial device certificate against a root certificate or intermediate certificate of the issuer of the initial device certificate and for establishment of a device certificate;

receive encrypted data from the OPC UA Client over the network, the encrypted data including the device certificate that is encrypted by using an initial device public key of the initial device certificate;

decrypt the encrypted data using an initial device private key associated with the initial device certificate to obtain the device certificate;

store the device certificate in the memory of the target device; and open a secured OPC UA Endpoint by the OPC UA Server, the secured OPC UA Endpoint providing access to technical functions of the target device via secure communication over the network based on the device certificate.

14. The target device according to claim 13, wherein the target device is a field device for an automation process.

15. A computer program product embodied on a non-transitory computer readable medium containing a computer program, which, when installed in and executed by a target device comprising a memory and a network connector with which the target device is connected to a network, causes the target device to:

open an unsecured Open Platform Communications Unified Architecture (OPC UA) Endpoint by an OPC UA Server that runs on the target device, the unsecured OPC UA Endpoint providing security context data that is in conformity with an OPC UA information model, wherein the security context data indicates the presence of an initial device certificate stored in the memory;

receive a request for the initial device certificate from an OPC UA Client that is connected with the OPC UA Server over the network;

retrieve the initial device certificate from the memory and send the initial device certificate by unsecured communication over the network from the UPC UA Server to the OPC UA Client for validation of the initial device certificate against a root certificate or intermediate certificate of the issuer of the initial device certificate and for establishment of a device certificate;

receive encrypted data from the OPC UA Client over the network, the encrypted data including the device certificate that is encrypted by using an initial device public key of the initial device certificate;

decrypt the encrypted data using an initial device private key associated with the initial device certificate to obtain the device certificate;

store the device certificate in the memory of the target device; and open a secured OPC UA Endpoint by the OPC UA Server, the secured OPC UA Endpoint providing access to technical functions of the target device via secure communication over the network based on the device certificate.

* * * * *